United States Patent [19]

Watanabe et al.

[11] Patent Number: 4,695,724

[45] Date of Patent: Sep. 22, 1987

[54] AC-MODULATION QUADRUPOLE MASS SPECTROMETER

[75] Inventors: Fumio Watanabe, Fukushima; Shojiro Komaki, Tokyo; Masao Miyamoto, Tokyo; Takao Ito, Tokyo, all of Japan

[73] Assignee: Seiko Instruments & Electronics Ltd., Tokyo, Japan

[21] Appl. No.: 935,097

[22] Filed: Nov. 24, 1986

Related U.S. Application Data

[63] Continuation of Ser. No. 658,481, Oct. 9, 1984, abandoned.

[30] Foreign Application Priority Data

Oct. 14, 1983 [JP] Japan ................................ 58-192112

[51] Int. Cl.[4] .............................................. B01D 59/44

[52] U.S. Cl. .................................... 250/292; 250/281; 250/290

[58] Field of Search ................ 250/281, 286, 290, 292

[56] References Cited

U.S. PATENT DOCUMENTS

| | | | |
|---|---|---|---|
| 2,921,198 | 1/1960 | Warmoltz et al. | 250/290 |
| 3,555,271 | 1/1971 | Brubaker et al. | 250/292 |
| 4,409,482 | 10/1983 | Scheid et al. | 250/282 |

*Primary Examiner*—Bruce C. Anderson

*Attorney, Agent, or Firm*—Bruce L. Adams; Van C. Wilks

[57] ABSTRACT

A quadrupole mass spectrometer generates a stream of ionized particles which are modulated by an AC voltage and transmitted through a quadrupole analyzer to a detection unit. The detection unit detects at a collector electrode thereof a modulated ion current which is fed to a phase detector. The phase detector synchronizes the modulated ion current with a signal of known frequency to produce a DC voltage representative of the level of the modulated ion current. By modulating the ionized particles with the AC voltage, the S/N ratio is improved and adverse effects of external noise are diminished.

9 Claims, 2 Drawing Figures

AC-MODULATION QUADRUPOLE MASS SPECTROMETER

This is a Rule 62 continuation application of Ser. No. 658,481 filed Oct. 9, 1984 which claims priority of Japanese Patent Application No. 192112/83 filed Oct. 14, 1983, now abandoned.

BACKGROUND OF THE INVENTION

The present invention relates to a highly-sensitive quadrupole mass spectrometer which detects an ion current by an AC-modulation system.

In the prior art, a mass spectrometer ionizes gaseous molecules by electron bombardment, and the thus-generated ions are classified and detected electrically and magnetically in accordance with their masses. Since such a mass spectrometer has a sensitivity of about $3\times10^{-3}$ A/Torr, the ion currents below $10^{-12}$ A are found to be very weak, when measured at a partial pressure of a very high vacuum of less than $10^{-8}$ Torr. When detecting such weak DC currents, accurate measurement is difficult because of the occurrence of offset and drift, and the generation of noise. Sensitivity can be improved by the use of a secondary electron multiplier, but a high-voltage source is necessary therefor, which has the disadvantage of increasing the size of the system.

SUMMARY OF THE INVENTION

An object of the present invention is to provide a small quadrupole mass spectrometer which is free of these defects, and which enables adequate measurement of partial pressures of detected gas components, even within very high vacuum regions, without the need of an electron multiplier.

DETAILED DESCRIPTION OF THE INVENTION

The present invention will be described in detail in the following with reference to the accompanying drawings.

Figure 1:
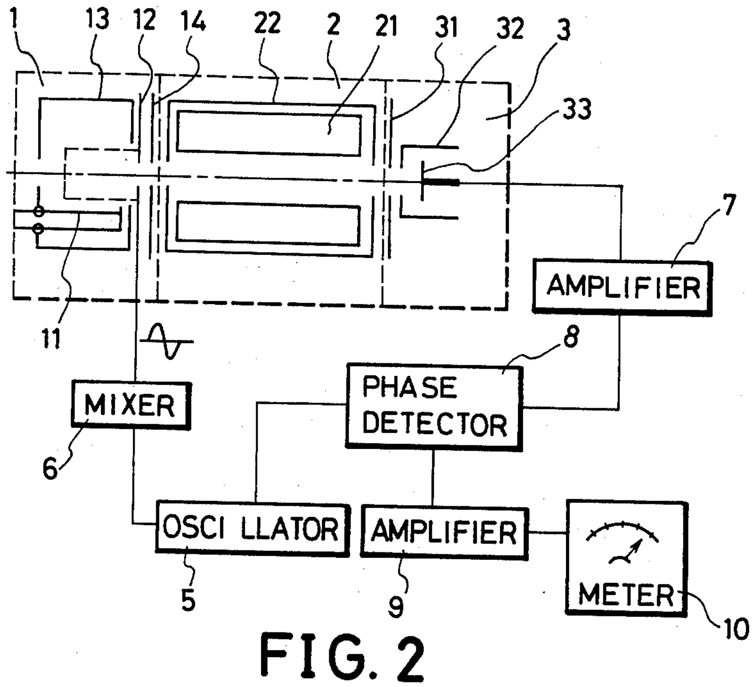
FIG. 1 is a block diagram of a quadrupole mass spectrometer with a B-A type ion source, according to the present invention.

FIG. 1 is a block diagram of one embodiment of a quadrupole mass spectrometer using a B-A guage type of ion source, according to the present invention. This quadrupole mass spectrometer is constructed of an ion source unit 1 which generates ions in the form of an ionized particle stream, a quadrupole analysis unit 2 which analyzes the ions, and a detection unit 3 which detects ions passing through it. The ion source unit 1 is composed of a filament 11, a grid electrode 12, a repeller electrode 13 which reflects electrons internally, and an emitter electrode 14. The quadrupole analysis unit 2 comprises four electrodes 21 and an electrode shield 22. The detection unit 3 is composed of a suppressor electrode 31, a collector shield 32 and a collector electrode 33. A constant low-frequency AC signal from an oscillator 5 is applied through a mixer 6 to the grid electrode 12. The ions generated by the ion source unit 1 are modulated by the application of an AC electrical field to the grid electrode 12. The ions thus modulated are emitted from the emitter electrode 14, filtered by the quadrupole analysis unit 2 and enter the collector electrode 33 of the detection unit 3. By such a construction the ion current signal which has entered to collector electrode 33 is modulated by the AC electrical field applied to the grid electrode 12. The thus-modulated ion current signal is amplified by a preamplifier 7 and input to a phase detector 8. The phase detector 8 generates a DC voltage according to the level of the ion current by synchronizing the signal from the oscillator 5 to the modulated ion current. This DC voltage is amplified by an amplifier 9 and fed to a meter 10. The ion current generated by the ion source unit 1 is modulated by the grid electrode 12 before it enters the quadrupole analysis unit 2. The individual ions analyzed by the quadrupole analysis unit 2 are also modulated. When analysis is performed by the quadrupole analysis unit 2, the relationship between the resolution M/ΔM and the accelerating voltage Eacc is given by the following equation:

$$M/\Delta M = \frac{4.2 \times 10^2 f^2(\mathrm{MHz}) \times L^2(M) M}{Eacc}, \qquad (1)$$

where:

f: frequency of the high-frequency voltage applied to the four electrodes 21;

L: length of the four electrodes 21; and

M: mass number of the substance being analyzed by the four electrodes 21.

In order to increase the resolution, the accelerating voltage Eacc should be as low as possible, but if the emitter potential is reduced too far, the ions will fail to reach the quadrupole analysis unit 2. Therefore, the voltage Eacc must be at a very high level. In order to provide a value of M/ΔM=20 to 30 for L=0.05 m to 0.10 m, the voltage Eacc must be between 4 to 20V for M=50. If the mass number M can be measured from 1, it is considered that the lower limit of the voltage Eacc will be 10V. If the voltage Eacc is the peak value of the modulated voltage, the modulated voltage applied to the grid electrode 12 must have a maximum of 10V. Generally speaking, the potential applied to the grid electrode 12 of a compact quadrupole mass spectrometer using the B-A ion source is between 3 to 5V. That potential has a maximum of 10V p-p in the modulating type of quadrupole mass spectrometer according to the present invention.

Figure 2:
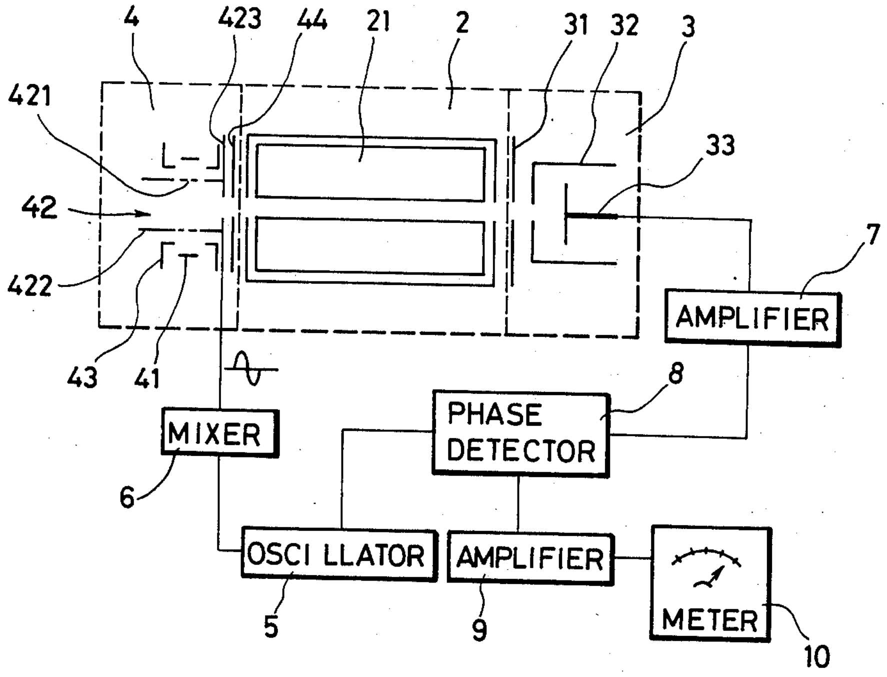
FIG. 2 is a block diagram of a quadrupole mass spectrometer with a bombarding type of ion source, according to the present invention.

FIG. 2 shows another embodiment of a modulating type of quadrupole mass spectrometer using a bombarding ion source, according to the present invention. A major difference therein from the embodiment of FIG. 1 resides in the construction of the ion source unit 4. The quadrupole analysis unit 2, the detection unit 3 and the circuitry 5–10 thereof are exactly the same. The bombarding ion source unit 4 comprises a hollow anode electrode 42 provided with a screen electrode portion 421 and a cylindrical electrode portion 422, through which electrons from a hot-cathode filament 41 can pass, and a flanged electrode portion 423; a shield electrode 43 which emits hot electrons efficiently from the hot-cathode filament 41 toward the central portion of the anode electrode 42; and an ion-emitter electrode 44. Because of this construction, the bombarding ion source restricts the angle with which the electrons enter the cylinder, to eliminate vertical vibrations of the electrons within the cylinder, and thereby concentrate the ion-generating region to the interior of the cylinder, which preventing the dispersion of ion energy, so that the diameter of the ion beam can be reduced while increasing the efficiency with which ions are emitted from the ion emitter, and thus the sensitivity. This makes it possible to construct a quadrupole mass spectrometer of the modulating type which has a high modulating efficiency and resolution.

As has been described above, according to the present invention it is possible to provide a quadrupole mass spectrometer which is compact but which can adequately measure partial pressures of the detected gas component, even within a very high vacuum range.

In these embodiments of the present invention, a modulated electrical field is applied to the anode electrode. It is obvious that the same effect can be obtained if an AC electrical field is applied to another electrode of the ion source unit, e.g., the filament or the shielding electrode.

What is claimed is:

1. A quadrupole mass spectrometer comprising: ion generating means for generating an ionized particle stream; modulating means coacting with the ion generating means for modulating the ionized particle stream with an AC voltage to produce a frequency-modulated ionized particle stream, the modulating means including an oscillator for producing a frequency signal, and a mixer connected to receive the frequency signal from the oscillator for producing therefrom the AC voltage; quadrupole analyzing means for receiving and analyzing the frequency-modulated ionized particle stream; detecting means for receiving the analyzed frequency-modulated ionized particle stream and detecting therefrom a modulated ion current signal; and synchronizing means for receiving the frequency signal and the modulated ion current signal and synchronizing the frequency signal with the modulated ion current signal to produce a DC voltage output signal representative of the level of the modulated ion current signal analyzed by the quadrupole analyzing means.

2. A quadrupole mass spectrometer according to claim 1, wherein the ion generating means includes a grid electrode through which passes the ionized particle stream; and the modulating means comprises means for applying a low frequency AC voltage to the grid electrode to produce a low frequency AC-modulated ionized particle stream.

3. A quadrupole mass spectrometer according to claim 2; including an oscillator for producing a constant frequency output signal; and wherein the phase detecting means includes means for synchronizing the constant frequency output signal of the oscillator with the modulated ion current signal to produce the DC voltage output signal.

4. A quadrupole mass spectrometer according to claim 2; wherein the ion generating means comprises a B-A type ion source.

5. A quadrupole mass spectrometer according to claim 1; wherein the ion generating means includes a hollow anode electrode through which passes the ionized particle stream; and the modulating means comprises means for applying a low frequency AC voltage to the anode electrode to produce a low frequency AC-modulated ionized particle stream.

6. A quadrupole mass spectrometer according to claim 5; including an oscillator for producing a constant frequency output signal; and wherein the phase detecting means includes means for synchronizing the constant frequency output signal of the oscillator with the modulated ion current signal to produce the DC voltage output signal.

7. A quadrupole mass spectrometer according to claim 5; wherein the ion generating means comprises a bombarding type ion source.

8. A quadrupole mass spectrometer according to claim 1; including an oscillator for producing a constant frequency output signal; and wherein the phase detecting means includes means for synchronizing the constant frequency output signal of the oscillator with the modulated ion current signal to produce the DC voltage output signal.

9. A quadrupole mass spectrometer according to claim 1; wherein the modulating means comprises means for modulating the ionized particle stream with a constant low frequency electric field.

* * * * *